March 20, 1945. F. A. PARSONS 2,371,975
COOKING UTENSIL
Filed Feb. 1, 1941

INVENTOR
Fred A. Parsons

Patented Mar. 20, 1945

2,371,975

UNITED STATES PATENT OFFICE 2,371,975

COOKING UTENSIL

Fred A. Parsons, Milwaukee, Wis.

Application February 1, 1941, Serial No. 376,948

2 Claims. (Cl. 219—35)

This invention relates to cooking devices, and more particularly where electrically heated, and is a continuation in part of a copending application, Serial No. 238,503, filed November 3, 1938, issued December 23, 1941, as Patent No. 2,266,901.

A well-known type of cookers, generally known to the trade as electric roasters or electric cookers, provides a main food container which is upwardly open, for insertion of food materials, being closed during cooking operations by a removable cover. These roasters or cookers are used for baking, both for meats and pastries, and also for cooking of vegetables, often simultaneously with meat. It is common practice to cook both roast meats and vegetables with little or no added water, and this type of cooking, as well as the baking of cakes and pastry and various other operations requires that the bottom of the container should be evenly heated and should not be substantially hotter than the air within the container, which also should be of uniform heat.

The conditions mentioned are difficult to obtain where, as in the type of cookers mentioned, the heat is normally applied only through the sides and bottom of the food container, and particularly where the container is relatively shallow or horizontally elongated as, for example, in an oval form, or in the rectangular form shown herein. In usual types of such devices the necessary heat conditions, such as described, are obtained only at the expense of relatively slow or inefficient heating, or both. Slow heating provides time for the heat to equalize in the container walls, and in the interior, but the delay is very objectionable when pre-heating the utensil to an initial high temperature such as is required, for example, where roasts are initially seared on the outer surfaces before proceeding with the roasting, to improve the flavor and to retain the juices.

It is a purpose of the invention to provide an improved electrically heated cooking device in which the bottom wall of the food container and the air within the container can be heated to a relatively high temperature which is substantially equal in the bottom wall and container air, in a minimum time and with a minimum of current, and particularly for an open top container of a length greater than its width; and to provide a device in which a desired similarly uniform temperature may be maintained for protracted cooking operations with a minimum of current.

A further purpose is to provide a cooking device of a specific type, namely, a cooker of the type in which the food receiving opening is at the top of the container, and in which the container is longer than it is wide as, for example, rectangular or elliptical in horizontal outline, and of improved results, particularly in one or more of the matters previously referred to, and especially for electrically heated cookers.

Further purposes are to provide an improved method and construction, particularly for a utensil of the type previously referred to, in which electrical heating elements are incorporated in such manner that the heat is applied substantially directly to the interior wall surface of the food container, whereby to effect both quick heating and economy of heat, but with adequate provision for preventing localized heating, particularly for the bottom wall of the container, and with adequate provision against exposure of heating elements in any manner which might be dangerous to the user of the device, or which might subject the elements to damage caused by exposure.

A further purpose is generally to simplify and improve the construction and operation of cooking devices, especially in one or more of the matters previously mentioned, and particularly, for electrically heated cooking devices.

The invention includes the construction and combination of parts as herein illustrated, described and claimed and, since modifications are contemplated, also includes such modification of the structure illustrated and described as may be equivalent to the claims.

The same reference characters have been used for the same parts throughout, and in the drawing.

Figure 1:
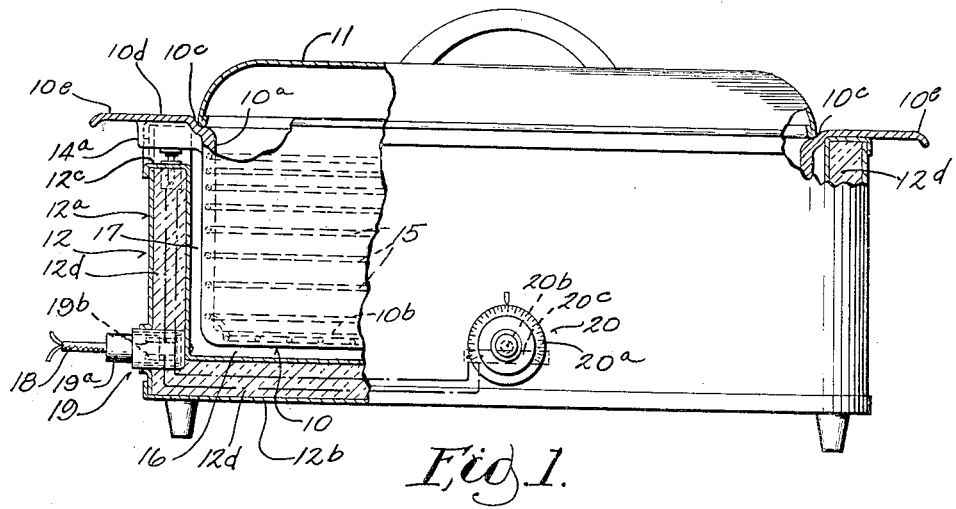
Figure 1 shows a cooking utensil incorporating the invention in one of its forms, partly in front elevation and partly in vertical section approximately along line 1—1, Fig. 2.
Figure 2:
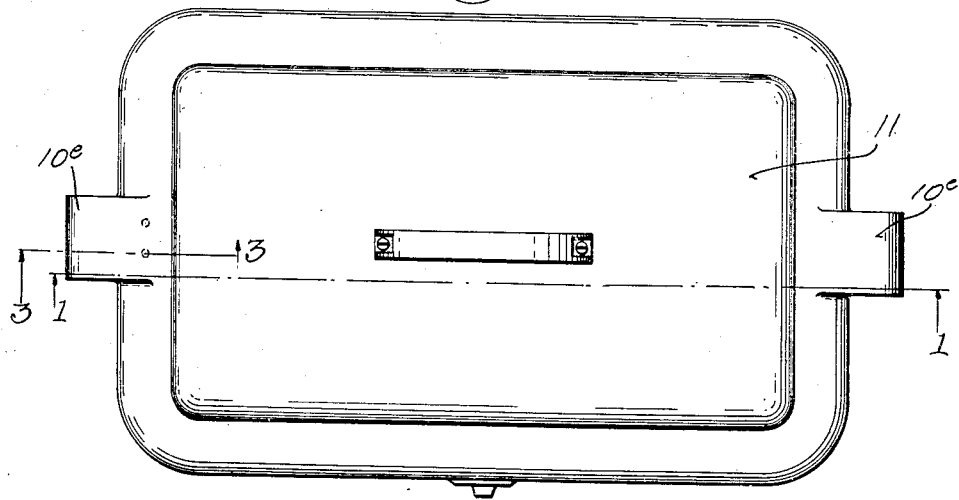
Figure 2 shows a top view of the utensil shown in Fig. 1.

The utensil here shown has similar main parts, as follows: A main food container 10 is of pan-like form with horizontal cross section form substantially longer than its width, and is upwardly open, and has vertical side walls 10a and a horizontal bottom wall 10b. The container side walls are flanged outwardly at the top as at 10c to provide an inner grooved ledge to receive and locate an upwardly removable cover 11, the flange 10c being further outwardly extended as at 10d to rest on the top of side walls 12a of an upwardly open support or outer shell 12 laterally surrounding container 10 and having a bottom wall 12b, the rim of the flange being still further extended, as at 10e, to provide handles for the container. A portion of one of the side walls of the outer shell 12 is provided with a depression or configuration 12c downwardly from the top margin thereof to receive a housing portion 14a of a connector generally denoted as 14, for supply of heating current to a resistor or heater wire 15, which is carried between the inner and outer surfaces of the side and bottom walls of the container 10, as later more fully described.

Both the side and bottom walls of the outer shell 12 may be constructed of spaced sheet material forming interior wall spaces within which heat insulating material of any suitable type, such as glass wool or the like, may be packed as indicated at 12d, 12d. The flange portions 10c of the container fit interiorly within the side walls of the shell to space the container side walls 10a substantially equally inside the shell side walls at all points around the periphery of the container, and to support the container for the bottom wall 10b thereof to be spaced above the bottom wall 12b of the outer shell, the vertical spacing being substantially uniform over the area of the container bottom wall 10b. The outer shell or support thus provides an upwardly open well in which the spacing and positioning of the container 10 as described provides a substantially horizontal bottom chamber 16 underneath the container bottom wall 10b and above the bottom wall 12b of the outer shell, and a substantially vertical chamber 17 extended about the periphery of the container 10, the vertical chamber 17 being substantially closed at the top by the flange of container 10 and having its bottom portion in communication with the outer top edge of bottom chamber 16.

Current is supplied to the resistor or heater 15 through a flexible electric cable or cord 18 terminating in a plug and socket connector device 19 in which the socket portion 19a is, preferably, attached to and removable with the cord 18, and the plug portion is fixed with the side wall of shell or housing 12 and provides a plurality of plugs or prongs 19b, 19b adapted respectively to connect electrically, through different of the socket portions, with different of the conductor wires of cable 18. The different connector prongs 19b, 19b are respectively connected within the side wall 12a of the shell 12 to different socket portions 14b, 14b, Fig. 6, of the connector 14, the socket portions being fixed with the side wall 12a at the bottom of the recess 12c, and respectively adapted to removably receive different connector plugs or prongs 14c, 14c. As shown in Fig. 1, the circuit connecting the plugs 19b, 19b with the sockets 14b, 14b includes a thermostatic control device generally denoted as 20. The device 20 may be of any suitable well-known type, and includes a temperature dial, such as 20a, connected as by a shaft 20b with an interrupter device 20c which indirectly receives heat from the bottom of container 10 and operates at the temperature setting of dial 20a to interrupt the current supply to the heater wire, also operating as the temperature drops below the dial setting to again connect the current, whereby to establish and maintain within the container the indicated temperature when the connector plugs 19b, 19b are supplied with line current from the cable 18.

Figures 3, 4, 5, 6:
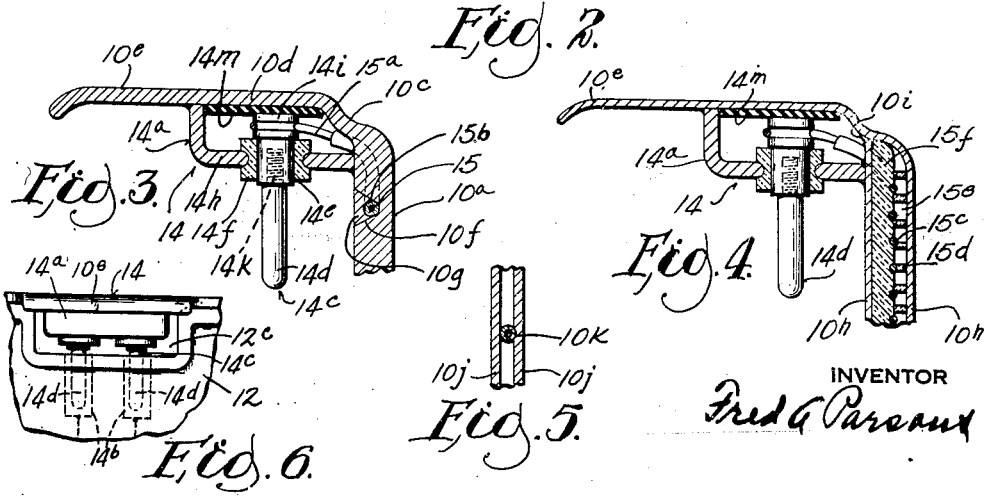
Figure 3 shows an enlarged partial vertical section of a food container shown in Fig. 1, taken approximately along line 3—3 of Fig. 2, illustrating one method of heating the walls of the container, and of providing an electric connection for the heating element.
Figures 4 and 5 are fragmentary vertical sections of the side wall of a food container shown in Figs. 1, 2, and disclosing, respectively different modified forms of the means for heating the container walls.
Figure 6 is a diagrammatic view of a connector device used in the cooker.

The socket portions of the connector devices 14, 19 and the plug portions of the connector 17 may be of any suitable well-known form and will not, therefore, be further described. The plug portions 14, 14c, Fig. 6, of the connector 14 are respectively connected to opposite ends of the heater wire 15 and since the connection is similar for each plug portion only one connection will be described in detail. Referring to Figs. 3, 4, 6 the coupling plug portion comprises an outer or socket engaging end portion 14d which is carried on a body portion 14e rigidly fixed in an insulator member 14f, the insulator member being rigidly fixed with a bottom wall portion 14h of the connector housing.

The connector housing 14a is hollow, but sealed against entrance of liquid or moisture, even when immersed in liquid. The one side wall and the top wall of the housing comprise portions of the side wall and top flange of the container 10, as appears in Figs. 3, 4. The bottom and the other sides of the housing 14a may be initially formed separately from the container 10, as for example by a member formed from sheet metal, or cast, of the same material as the container, and having edges formed to closely fit against the container, while providing an interior hollow space into which the plug body 14e may project. Fixed with the plug body 14e there is a head portion 14i within the housing, joined in current transmitting relation to one end, such as 15a, of the heater wire 15.

After each of the ends of the heater wire are respectively joined to the different heads such as 14i of the connector plugs, the separately formed housing portion is set in place and welded, brazed or otherwise suitably joined at its edges to the complementary surfaces of the container 10, whereby to effect the closing of the housing 14 against entrance of liquid or moisture, as described, there being an insulating strip, such as 14m, inserted to prevent the plug heads such as 14i from being short circuited by contact with the container flange. Since the plug body portions such as 14e are permanently fixed with the housing, and are not intended to be removed except with considerable difficulty, the plug portions such as 14d are preferably removably fixed in the body portions, as by threaded engagement of the plugs with suitable threaded sockets in the body portions 14e, as at 14k.

The resistance heater wire 15 is distributed between the outer and inner surfaces both of the side walls 10a and of bottom wall 10b of container 10, as stated. The arrangement is diagrammatically indicated in Fig. 1 and different illustrative methods contemplated for such construction are illustrated respectively in Figs. 3, 4, 5.

Referring to Fig. 3, in this modification the container walls which receive the wire 15 are of relatively thick material, preferably of a metal which will rapidly conduct heat as, for example, copper or aluminum. The walls may be initially provided with exterior grooves, such as 10f, which follow the distribution pattern, later referred to, desired for the heater wires. The heater wire, throughout its length, except at the ends where joined to the plug heads 14i, is provided with a suitable heat resistant insulation covering as at 15b, and after the wire has been placed in the grooves 10f the groove is permanently sealed as at 10g preferably by substantially the same material as the container walls. This may be done, for example, by welding or brazing in place a suitably formed strip of the material, or by flowing the sealing material into the groove.

Referring to Fig. 4, a somewhat different method of construction is shown. Both the side walls and bottom wall of the container are formed of spaced, relatively thin, inner and outer sheets as at 10h, 10h each formed into the shallow pan-like shape of the container, one of the sheets being extended to form the container top flange and handles previously referred to, the two pan-shaped parts being joined together by brazing, welding or the like, as at 10i. Prior to such assembly the heater wire, which may be without insulation in this instance, is wound in suitable guide grooves such as 15c formed in a sheet of insulating material such as 15d which is interposed between the heater wire and the inner wall sheet of the container, but may be provided with spaced holes or apertures such as 15e through which heat may radiate directly to the inner sheet of the container walls. After the wire is in place it is covered with a layer of material acting both as heat insulation and electrical insulation, such, for example, as glass wool or the like, as at 15f, the insulation also serving to hold the wire in place even if it should be loosened in the grooves.

Referring to Fig. 5, in this modification the container side and bottom walls are formed similarly to Fig. 4 of pan-like inner and outer sheets, such as 10j, 10j but in this instance spaced closer together. The exterior of the inner sheet is grooved as at 10k to suit the pattern of the heater wire, which fits in the groove, being insulated in this instance, similarly to Fig. 3. The outer sheet, when in place, prevents displacement of the heater wire.

Each of the modifications of Figs. 3, 4, 5 is so constructed as to very rapidly and efficiently heat the inner wall surface of the container 10 from the heater wire 15. In part this result is effected by the relatively short and efficient path through which the heat travels inwardly into the container, and in part by the construction resistant to an outward flow of heat. Such heat resistant means, in each of the modifications here shown, includes the air gap formed by the lower and vertical chambers 16, 17 and also the insulation effect of the outer shell or support 12. In the modification of Fig. 4 it also includes the insulation between the inner and outer walls of the container and the hollow space in the walls of the modification of Fig. 5 acts somewhat in the same manner. As for the modification of Fig. 4 the insulation within the container walls is sufficient that the double wall and insulation of the outer shell may, if desired, be eliminated.

Moreover, the arrangement and distribution pattern of the heater wire, as determined by the retaining grooves such as 10f, 15c, 10k, may be such as to accurately and precisely supply extra heat to those portions of the container which are normally slowest or most difficult to heat.

Further, any heat which radiates outwardly from the exterior wall of the container is mostly, by reason of the construction, trapped on the interior wall of the outer shell or support, where it acts to reduce further heat loss by outward radiation by reducing the temperature difference. In the conventional types of cookers, previously mentioned, the exact opposite result obtains, the container receiving heat only when the wall of the outer shell is hotter than the container.

Whether for the initial heating or for subsequent maintenance of the desired cooking temperature, the economy of heating is greatly increased, not only by the substantially direct application of heat and greatly increased resistance against outward heat flow, as described, but also by the establishment and maintenance of an exact and precise heat application pattern substantially directly at the surface to be heated.

Furthermore, the utmost of preferred distribution of actual cooking heat may be readily obtained by the structure shown. The preferred operating heat at all cooking temperatures is completely uniform over the bottom wall of the container, with a substantial but graduated increase in temperature from the bottom to near the top of the side container walls, whereby an excess of heat may be forced into the container near the top, at a point where it cannot burn the foodstuff, partly in order to counteract the excess of radiation from the exposed container flanges and from the exposed cover. A pattern of heater wire distribution for such preferred heat distribution is indicated in Fig. 1 where the spacing of the wire is shown closer at the top of the container side walls than at the lower portions of the container.

To further increase the speed and efficiency of the heating any wall surfaces through which heat may flow outwardly from the heater wire are of a surface material and finish which will reflect radiant heat energy inwardly. Such material and finish may be applied, for example, to the inner surfaces of each of the sheets forming the hollow side and bottom walls of the outer shell or support 12, also to the inner surface of the outer sheet, Figs. 4, 5, of the container hollow side and bottom walls. Polished chromium surfaces are suitable for the purpose of such heat reflection, but various other surface materials may be used including polished aluminum, aluminum paint, or certain enamels.

By reason of the direct application and localizing of heating, confined to the container itself, and particularly where some or all the inwardly facing wall surfaces are heat reflecting, as described, the heat insulation material shown between the inner and outer sheets of the outer shell side and bottom walls may be omitted without much difference in result and, if desired, the side and bottom walls may be made of a single thickness of suitable material, such as so-called plastics.

The arrangement of connector plugs and sockets, as here shown, provides for energizing from a single source both a heater 15 associated with the removable container and a controller 20 associated with the outer shell or support, while fully protecting the heater element and at all times avoiding exposure of any active or energized current transmission member. If the controller 20 is not used it may be preferable to use only a single socket such as 19, directly associated with the container as, for example, with the housing portion 14. The socket 19 may also be associated with housing 14 when a controller 20 is used, the controller current in such case being transmitted through sockets such as 14b, 14b. It is also intended that where two plug connections are used, the source socket 19a shall be interchangeable between them whereby, for example, in the device of Fig. 1 the heating current may be applied directly to the container plug when the container is removed from the support, as for food warming purposes.

What is claimed is:

1. A cooking utensil comprising a food container having side walls and a bottom wall and a support therefor having side walls and a bottom wall, said container being removably carried by said support and the container and support walls when the container is in properly supported position defining an upwardly and laterally substantially closed vertical chamber substantially peripherally surrounding the container and a lower chamber underneath the container bottom wall and downwardly substantially closed, an electric heater wire embedded within some of said container walls in position for flow of heat outwardly therefrom to said support walls only after outward flow through a portion of a container wall and through one or the other of said chambers, said container walls providing locating means for said heating wire establishing a predetermined pattern of heat distribution for the container walls, a thermostatically controlled current interrupter device carried by said support to be operated by heat generated by said imbedded wire, and an electric circuit including said imbedded wire and the current interrupter elements of said device, said circuit also including connector terminals respectively carried by said container and by said support and adapted to be disengaged and engaged respectively as the container is removed from or returned to said properly supported position.

2. A cooking utensil comprising a food container having side walls and a bottom wall and a support therefor having side walls and a bottom wall, said container being removably carried by said support and the container and support walls when the container is in properly supported position defining an upwardly and laterally substantially closed vertical chamber substantially peripherally surrounding the container and a lower chamber underneath the container bottom wall and downwardly substantially closed, an electric heater wire embedded within some of said container walls in position for flow of heat outwardly therefrom to said support walls only after outward flow through a portion of a container wall and through one or the other of said chambers, said container walls providing locating means for said heating wire establishing a predetermined pattern of heat distribution for the container walls, a thermostatically controlled current regulating device carried by said support to be operated by heat generated by said embedded wire, and an electric circuit including said embedded wire and the current regulating elements of said device, said circuit also including connector terminals respectively carried by said container and by said support and adapted to be disengaged and engaged respectively as the container is removed from or returned to said properly supported position.

FRED A. PARSONS.